United States Patent [19]

Cheselka et al.

[11] Patent Number: 4,653,020

[45] Date of Patent: Mar. 24, 1987

[54] DISPLAY OF MULTIPLE DATA WINDOWS IN A MULTI-TASKING SYSTEM

[75] Inventors: Harry Cheselka, Saugerties; Jeffrey S. Lucash, Hurley; William R. Vincent, Poughkeepsie, all of N.Y.

[73] Assignee: International Business Machines Corporation, Armonk, N.Y.

[21] Appl. No.: 542,572

[22] Filed: Oct. 17, 1983

[51] Int. Cl.[4] .......................... G06F 3/14; G06F 15/00; G09G 1/06

[52] U.S. Cl. .......................... 364/900; 364/521; 340/721; 340/747

[58] Field of Search ... 364/200 MS File, 900 MS File, 364/521; 340/721, 722, 745, 750, 790, 799, 747

[56] References Cited

U.S. PATENT DOCUMENTS

| | | | |
|---|---|---|---|
| 4,197,590 | 4/1980 | Sukonick et al. | 340/721 X |
| 4,249,172 | 2/1981 | Watkins et al. | 340/726 |
| 4,317,114 | 2/1982 | Walker | 340/799 X |
| 4,354,232 | 10/1982 | Ryan | 364/200 |
| 4,366,536 | 12/1982 | Kohn | 364/200 |
| 4,408,197 | 10/1983 | Komatsu et al. | 340/750 X |
| 4,412,294 | 10/1983 | Watts et al. | 364/518 |
| 4,428,065 | 1/1984 | Duvall et al. | 364/900 |
| 4,451,825 | 5/1984 | Hall et al. | 340/750 |
| 4,484,302 | 11/1984 | Canson et al. | 364/900 |
| 4,498,081 | 2/1985 | Fukushima et al. | 340/721 X |
| 4,517,654 | 5/1985 | Carmean | 364/521 |
| 4,550,386 | 10/1985 | Hirosawa et al. | 364/900 |
| 4,555,775 | 11/1985 | Pike | 364/900 |

FOREIGN PATENT DOCUMENTS

| | | | |
|---|---|---|---|
| 0102926 | 8/1979 | Japan | 340/750 |
| 57-169838 | 10/1982 | Japan | 340/709 |

*Primary Examiner*—Archie E. Williams
*Assistant Examiner*—Thomas C. Lee
*Attorney, Agent, or Firm*—Frederick D. Poag; C. Lamont Whitham

[57] ABSTRACT

A multiple window display system is provided for displaying data from different applications in a multi-tasking environment. The display system includes plural screen buffers (12$_l$ to 12$_n$) for storing character codes and attribute codes of data which may be displayed on the display screen. Task selection means (26) selectively couples the output of a single selected one of the plural screen buffers to the character generator (16) and attribute logic (18) at any given time. Address modification means (20$_l$ to 20$_n$, 22$_l$ to 22$_n$) permits changes to be made in the display windows. The software driver includes screen control blocks (32), window control blocks (34), presentation space control blocks (36), presentation spaces (38), and a screen matrix (40) in system memory. The presentation spaces (38) receive application data for plural windows of the displayable area. Each window defines the whole or a subset of a corresponding presentation space. The screen matrix (40) is mapped to the display screen and filters data from the windows of the presentation spaces to the screen buffer to designate which of the data will be shown in corresponding positions on the display screen.

4 Claims, 10 Drawing Figures

DISPLAY OF MULTIPLE DATA WINDOWS IN A MULTI-TASKING SYSTEM

CROSS-REFERENCE TO RELATED APPLICATION

This application discloses subject matter which is common to application Ser. No. 542,376 filed by Jeffrey Stuart Lucash et al. on Oct. 17, 1983, and assigned to the assignee of this application.

FIELD OF THE INVENTION

The present invention is generally related to computer displays, and more particularly to hardware and software implementations that display multiple data windows on cathode ray tube (CRT), gas panel, liquid crystal displays (LCD) and other like displays commonly used in computer and data processing systems. The invention has particular application in multi-tasking computer environments wherein each window displays data from a different one of the tasks.

BACKGROUND OF THE INVENTION

Generation of video data for a raster scanned CRT is well understood. FIG. 1 shows a typical implementation. A CRT controller 10 is used to generate memory addresses for a display refresh buffer 12. A selector 14 interposed between the controller 10 and the buffer 12 is used to provide an alternate source of addressing so that the contents of the refresh buffer can be modified. Thus, the selector 14 may pass the refresh address from the controller 10 or an address on the system address bus to the display refresh buffer 12. By time division multiplexing (TDM) the refresh buffer bandwidth, interference between refresh and system accesses can be eliminated. For an alphanumeric character display, the display refresh buffer usually contains storage for a character code point and associated attributes. The character code point is used to address the character pel generator 16. Outputs from the character generator 16 are produced in synchronism with the scan line count output from the CRT controller 10. Attribute functions such as reverse video, blink, underscore, and the like are applied to the character generator outputs by the attribute logic 18, and the resultant pels are serialized to the video monitor.

A number of operating system (OS) and application programs allow a computer to carry on multiple tasks simultaneously. For example, a background data processing task might be carried on with a foreground word processing task. Related to the background data processing task might be a graphics generation task for producing pie or bar charts from the data generated in the data processing task. The data in all these tasks might be merged to produce a single document. The multi-tasking operation may be performed by a single computer such as one of the more popular micro computers now on the market, or it may be performed by a micro computer connected to a host computer. In the latter case, the host computer generally carries out the background data processing functions, while the micro computer carries out the foreground operations. By creating a composite display refresh buffer, the system shown in FIG. 1 can also be used to display windows from multiple tasks. Each task is independent of the others and occupies nonoverlapping space in the system memory. User defineable windows for the tasks resident in system memory can be constructed so as to display, within the limits imposed by the screen size, data from each of the tasks being processed. FIGS. 2A and 2B illustrate this concept. From the user perspective, windows can be displayed as either nonoverlapping, as shown in FIG. 2A, or layered or overlapping, as shown in FIG. 2B. It will be understood by those skilled in the art, however, that an overlapping display of the type shown in FIG. 2B does not imply lost data in the system memory. On the contrary, it is necessary to preserve the data for each task so that as an occulting window is moved about the display screen or even removed from the display screen, the underlying display data can be viewed by updating the refresh buffer.

While the implementation shown in FIG. 1 is adequate for a class of uses, it can become performance limited as the number of display windows and tasks is increased or as the display screen size is increased. As the time required to update the display refresh buffer significantly increases, system response time increases and therefore throughput decreases. Slower system response times can result from the following factors:

1. The display refresh buffer must be updated each time a task updates a location within system memory being windowed to the display screen. Control software, usually the OS, must monitor and detect the occurrence of this condition.

2. Scrolling data within one or more of the display windows requires the corresponding locations in the display refresh buffer to be updated. This may be better appreciated with reference to FIG. 3 which shows the case of nonoverlapping windows as in FIG. 2A. Scroling is accomplished by moving the viewable window within the system memory. Of course the same technique is used when scrolling data in overlapping windows as in FIG. 2B.

3. Whenever window sizes or positions are changed, the display refresh buffer must be updated with the appropriate locations from the system memory.

SUMMARY OF THE INVENTION

It is therefore an object of the present invention to provide a multiple data window display on a computer display that does not adversely effect the system response times as the number of data windows is increased.

It is another object of the invention to provide a multiple data window display that is especially effective for use in multi-tasking environments.

The foregoing and other objects of the invention are attained in both hardware and software. With respect to the hardware implementation, plural screen buffers are simultaneously read out cyclicly, and task selection means couple the output of a single one of the buffers to video output at any given time. For any given point on the screen, the data displayed originates from a selected buffer for composition of a screen picture derived from more than one of the screen buffers. The task selection means may be a separate task selection buffer and decoder, in which case the task selection buffer is synchronously addressed with the screen buffers and the decoder enable the read out of a single one of the screen buffers for any point on the display screen. Alternatively, one of the screen buffers may be designated to perform the operation of the task selection buffer. The display data in the designated screen buffer is non-transparent. This buffer is loaded with unique selection codes to indicate the portion of the display which is composed of data from the other screen buffers. The absence of one of these selection codes allows the non-transparent data to be displayed. The software implementation makes extensive use of system memory. The system memory provides presentation spaces for receiving application data for plural windows of the displayable area. Each window defines the whole or a subset of a corresponding presentation space. A window priority matrix mapped to the display screen filters the data from the windows of the presentation spaces to the screen buffer to designate which of the data will be shown in corresponding positions of the display screen.

BRIEF DESCRIPTION OF THE DRAWINGS

The foregoing and other objects, aspects and advantages of the invention will be better understood from the following detailed description with reference to the accompanying drawings, in which.

DETAILED DESCRIPTION OF THE INVENTION

The invention is described for use with a CRT display; however, this is but one of many types of displays including gas panels and liquid crystal displays which may be used in the practice of the invention. Therefore, those skilled in the art will understand that the mention of CRT displays is by way of example only. It follows therefore that the term refresh buffer, while having a particular meaning as applied to CRT displays, is fully equivalent to either a hardware or software screen buffer for storing data to be displayed.

Figure 1:
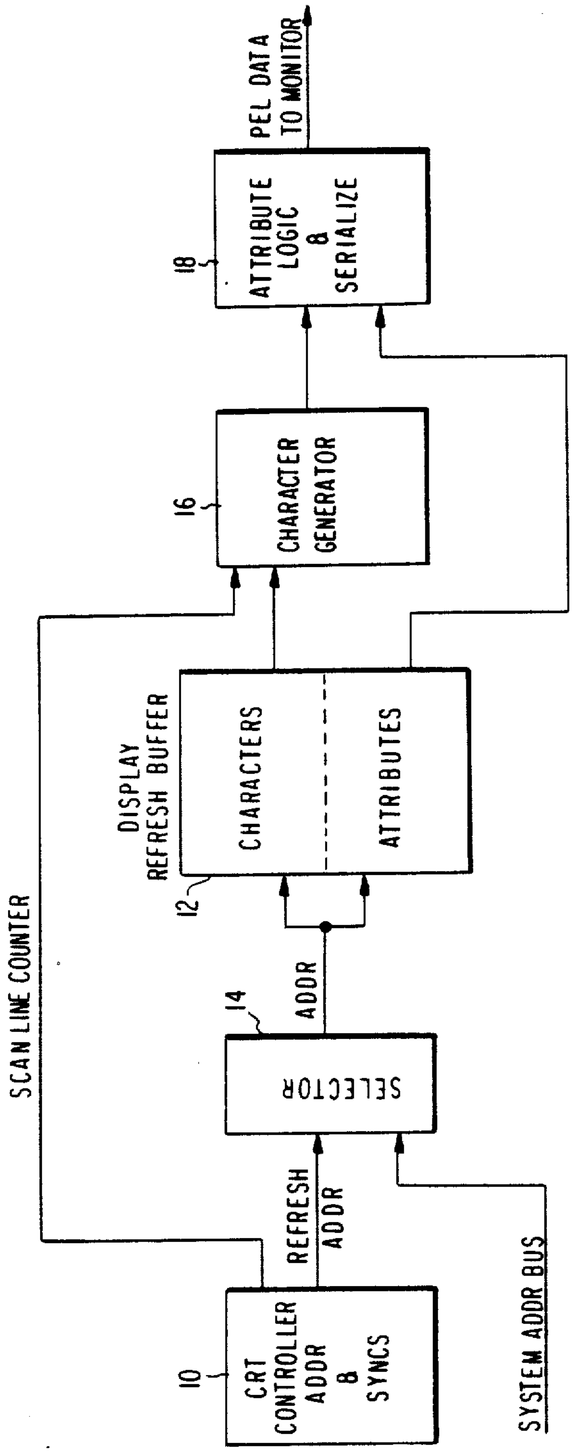
FIG 1 PRIOR ART
FIG. 1 is a block dagram of a prior art raster scanned CRT display generator.
Figure 2A:
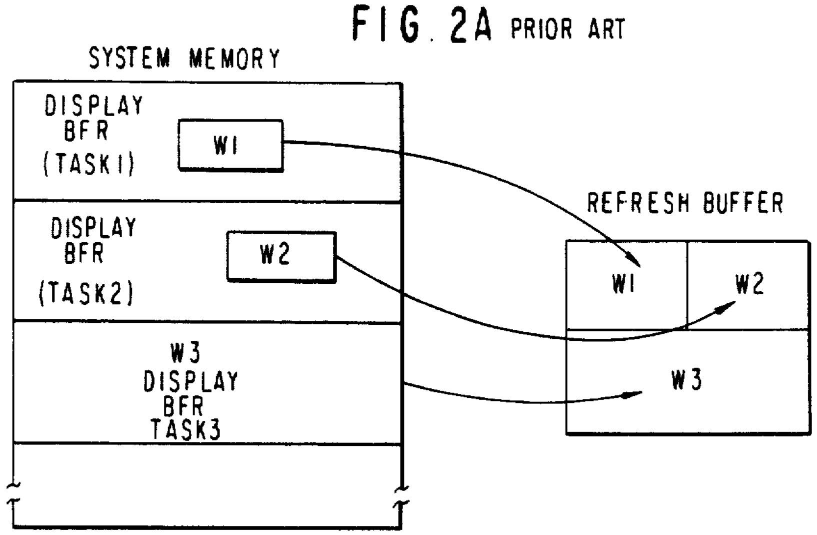
FIG. 2A PRIOR ART
FIGS. 2A and 2B illustrate the relationship of system memory to multiple window displays for nonoverlapping and overlapping windows, respectively, as produced by the prior art raster scanned CRT display generator of FIG. 1.
Figure 2B:
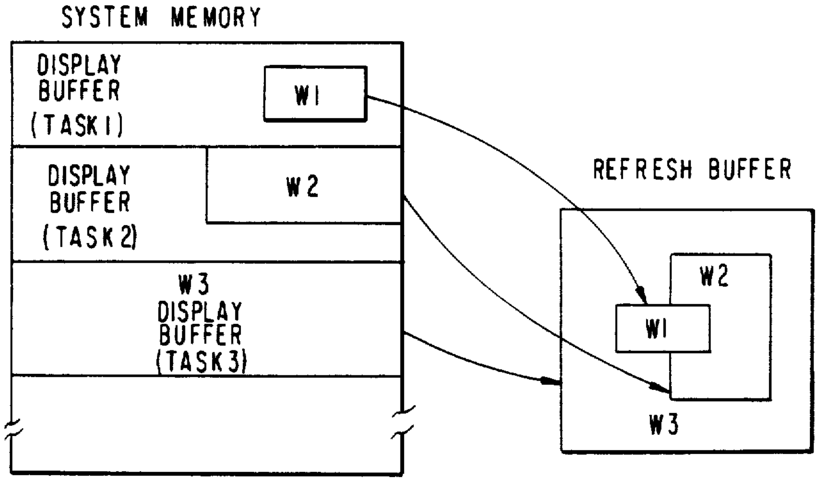
FIG. 2B PRIOR ART
Figure 3:
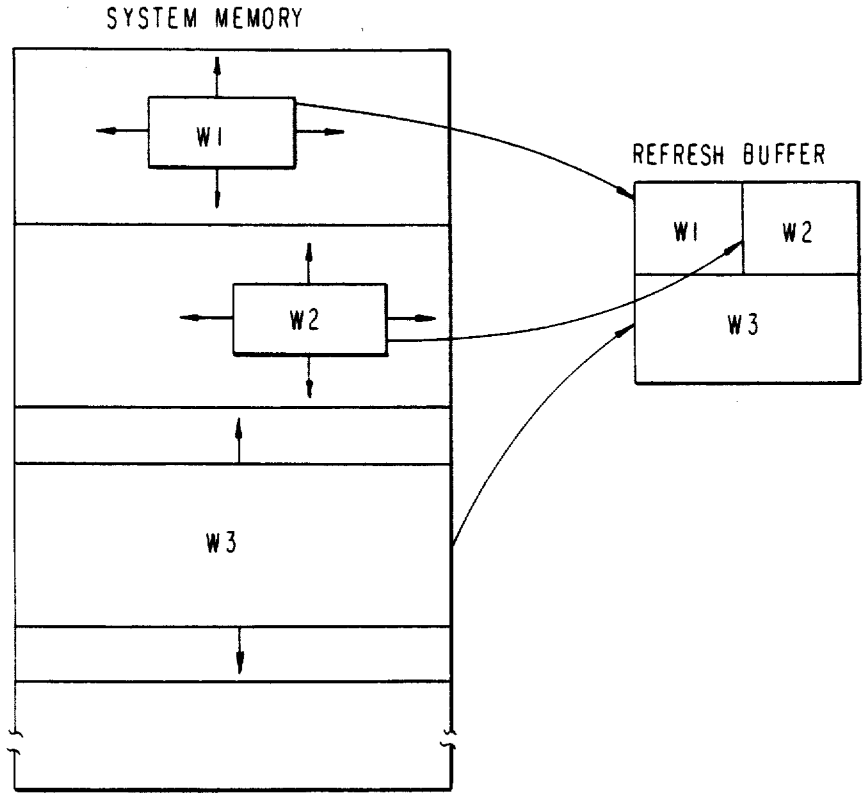
FIG. 3 PRIOR ART
FIG. 3 illustrates the technique for producing scrolling of data in a nonoverlapping window display.
Figure 4:
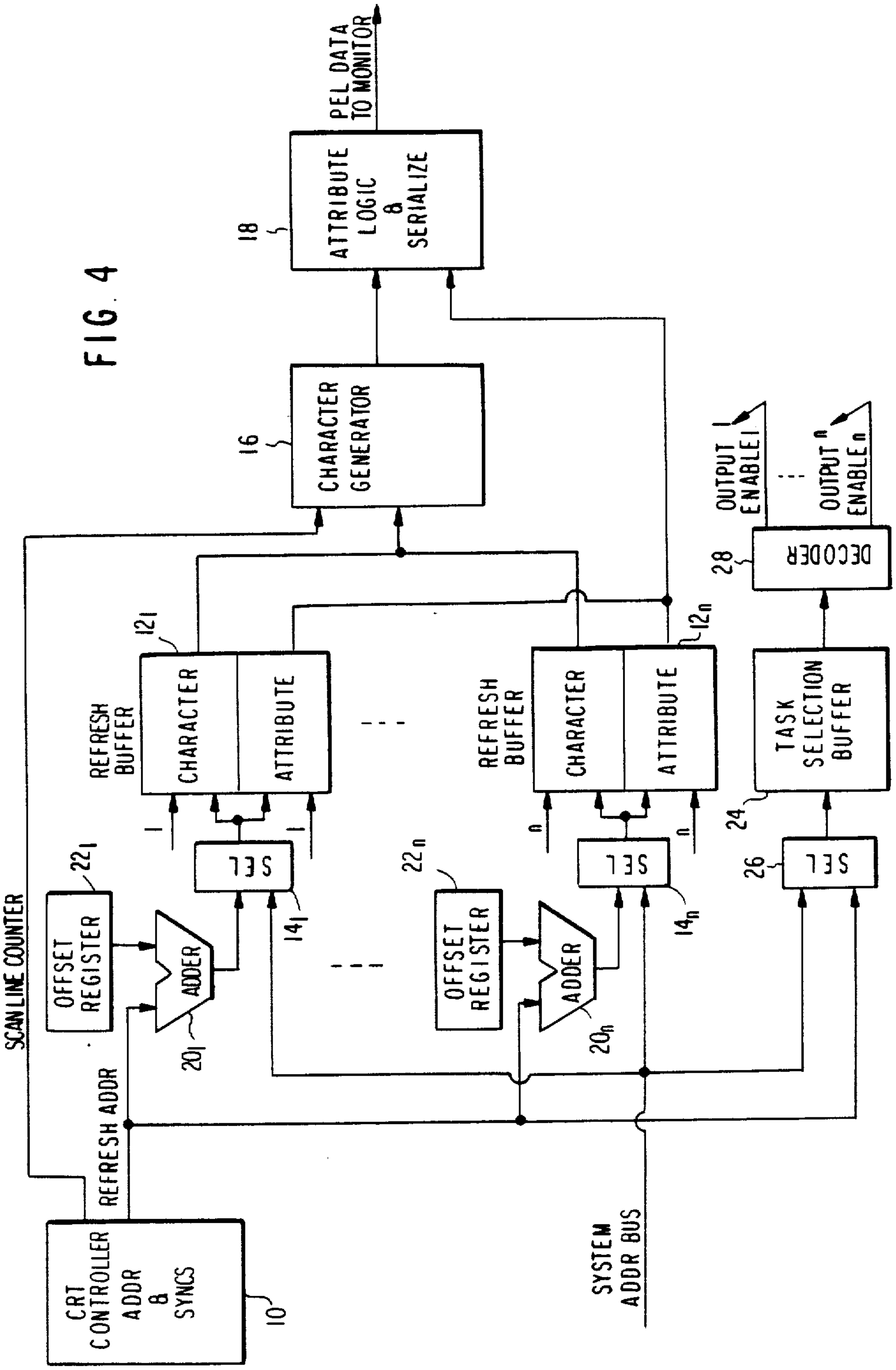
FIG. 4 is a block diagram of a hardware embodiment of a raster scanned CRT display generator according to the present invention.

The problems of slow system response time for multiple display windows in a multi-tasking environment are overcome by utilizing the implementation shown in FIG. 4 wherein the same reference numerals designate the same or similar circuits as in FIG. 1. Each task is given a dedicated refresh buffer which can be directly addressed; however, those skilled in the art will understand that this does not logically preclude including these addresses within the system memory map. Thus, there are provided refresh buffers $12_1$ to $12_n$, one for each task. Each refresh buffer has a corresponding selector $14_1$ to $14_n$; however, the refresh address from the CRT controller 10 is not supplied directly to these selectors. Instead, the refresh address from the CRT controller 10 is supplied to one of the operand inputs of adders $20_1$ to $20_n$. The other operand input to each of these adders is supplied by corresponding offset registers $22_1$ to $22_n$. An effective refresh address for any one of the refresh buffers is generated by adding the address provided by the CRT controller 10 with a value previously stored in the associated offset address register. Because a common refresh address is used in the example shown in FIG. 4, the width of the formated data must be the same for all the refresh buffers. Those skilled in the art will recognize that by separately addressing each of the refresh buffers and providing additional hardware to maintain synchronism in the read out of the buffers, it is possible to have different widths of formatted data in each of the refresh buffers. This added flexibility is achieved at the expense of greater complexity, and for purposes of providing a better understanding of the invention, only the simpler case is described.

For display refresh purposes, all refresh buffers are accessed in parallel. A task selection memory 24 is also accessed in parallel, via its selector 26 using the CRT controller produced address, to enable the output of a single refresh buffer. This is accomplished by means of decoder 28 which responds to the codes read out of the task selection memory 24 to generate enable outputs 1 to n. These enable outputs are provided to the corresponding refresh buffers $12_1$ to $12_n$ so that at any given time only one of the refresh buffers is being read out to the character generator 16 and attribute logic 18.

Figure 5:
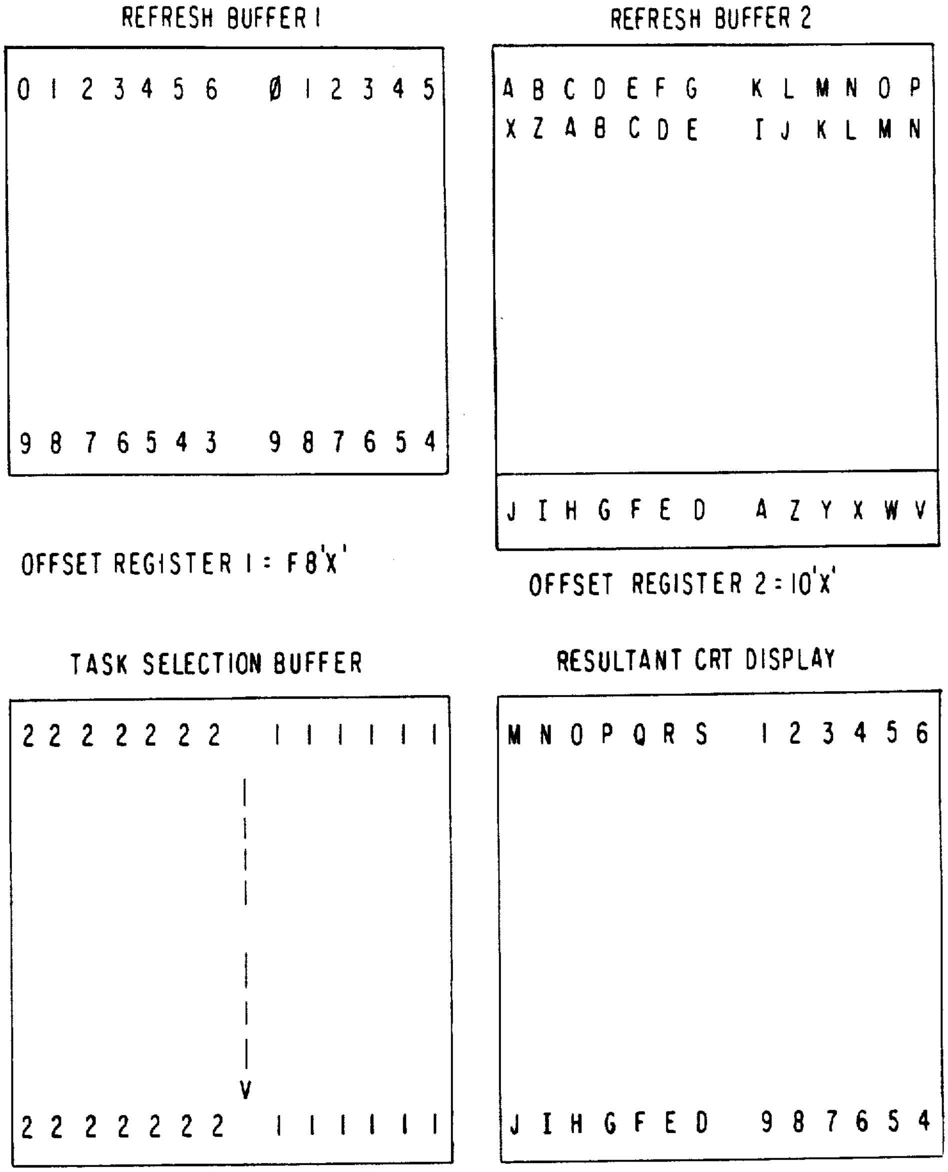
FIG. 5 illustrates the buffer maps and resultant display of a simple case of a two task display with the screen divided vertically.

The operation may be better appreciated with reference to FIG. 5 which shows the maps of the refresh buffers and task selection memory for the simple case of the display of two tasks with the screen divided vertically on a 16 row CRT with 16 characters per row. An 8-bit adder is assumed for this example. Refresh buffer 1 has numeric character data, while refresh buffer 2 has alpha character data. The offset register for refresh buffer 1 is loaded with the hexadecimal address F8'x', and the offset register for refresh buffer 2 is loaded with the hexadecimal address 10'x'. The task selection memory is mapped to display the data from task 2 in the left half of the screen and the data fom task 1 in the right half of the screen. This produces the resultant CRT display illustrated.

The main features of this scheme may be summarized as follows:

1. Each task is totally independent of the others.

2. Refresh buffer updates are solely controlled by tasks thereby eliminating the need for separate refresh buffer reconstruction.

3. Scrolling, on a task basis, is simply accomplished by updating the value in an address offset register.

4. Multiple window display with multi-layering is achieved through the use of a selection memory without affecting refresh buffer contents.

5. The system memory bus utilization is reduced.

Figure 6:
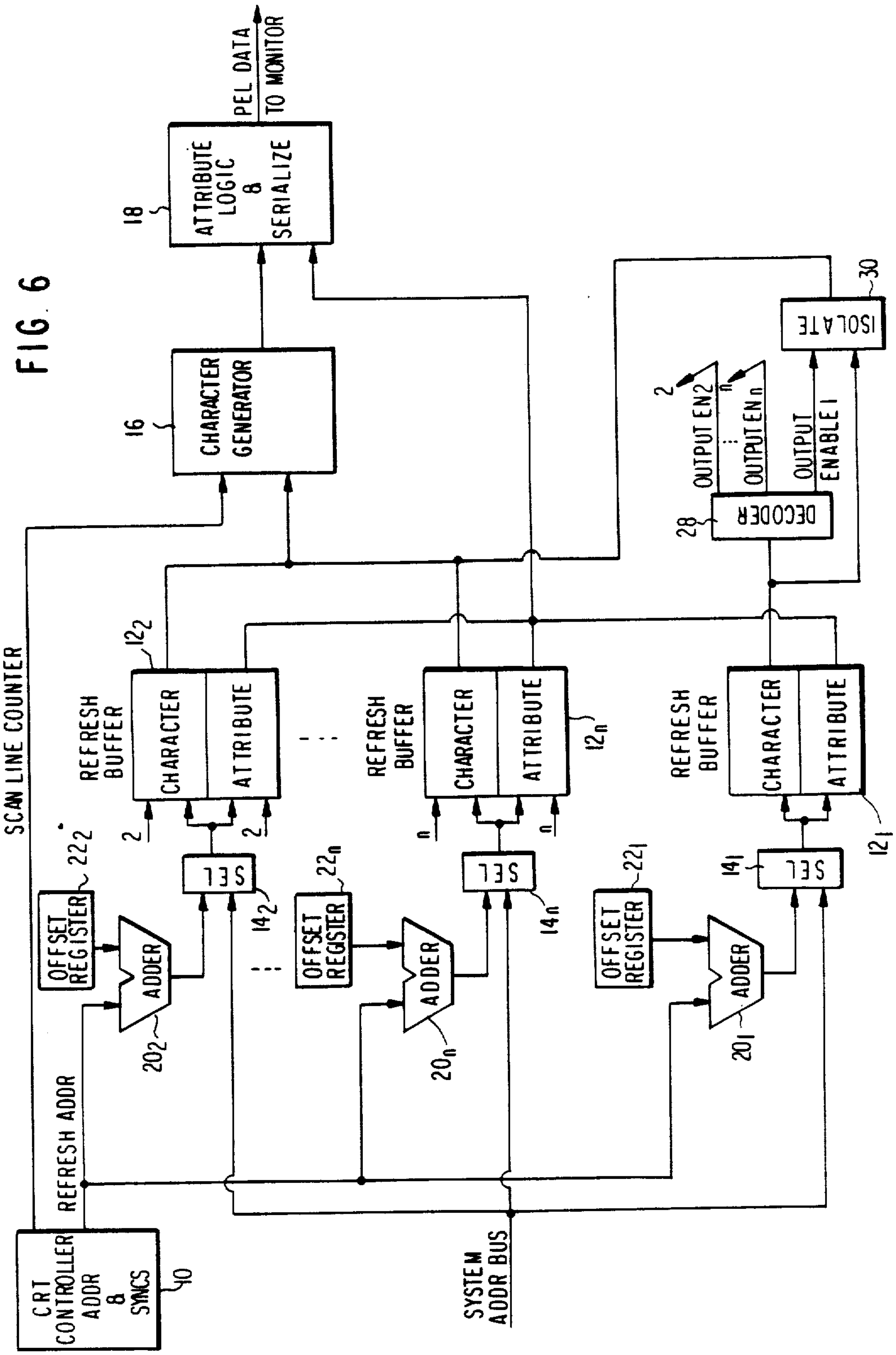
FIG. 6 is a block diagram of an alternative hardware embodiment of the raster scanned CRT display generator according to the invention.

A simplified variation of the system shown in FIG. 4 can be implemented as is shown in FIG. 6. The task selection memory 24 is eliminated by designating one of the refresh buffers to be non-transparent. In the case shown in FIG. 6, refresh buffer $12_1$ is so designated. The decoder 28 is retained and a gate 30 is added. Unique code points loaded into the non-transparent refresh buffer can then be used as the selection mechanism for the remaining transparent refresh buffers. The absence of one of these selection buffer code points allows the non-transparent display buffer outputs to be passed by the gate 30 to the character generator 16. This modification trades off hardware reduction against the performance loss caused by the non-transparent refresh buffer.

Figure 7:
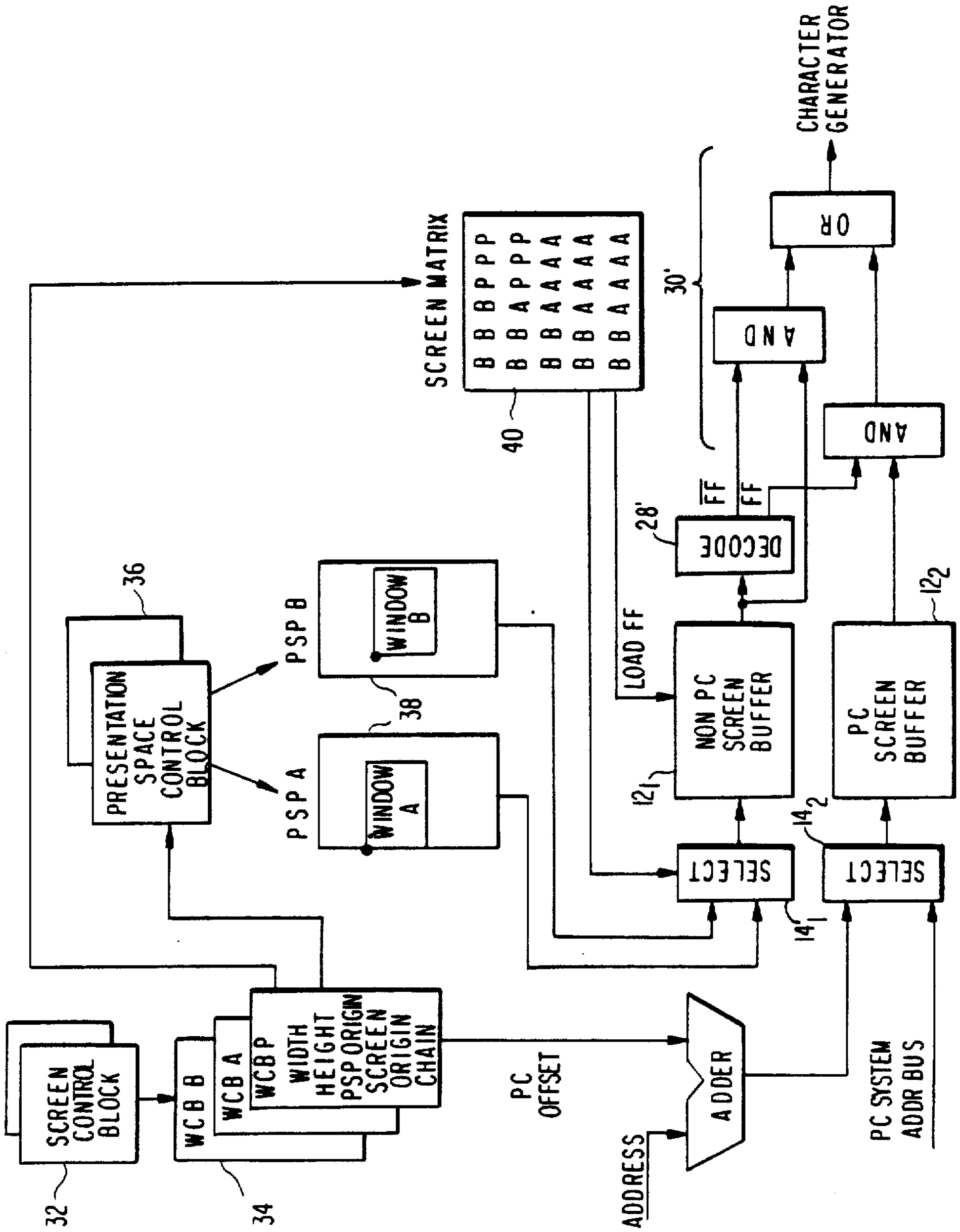
FIG. 7 is a functional block diagram of the software driver for the raster scanned CRT display generator according this invention.

FIG. 7 shows the software driver for operating a modification of the hardware shown in FIG. 6. In FIG. 7, only two hardware buffers $12_1$ and $12_2$ are used. In the specific case illustrated, a micro computer connected to a host computer is assumed with buffer $12_2$ being the micro computer buffer, but it will be understood by those skilled in the art that the technique applies also to a single computer provided there is sufficient system memory. As shown, this implementation employs screen control blocks 32, window control blocks 34, presentation space control blocks 36, presentation spaces 38, and a screen matrix 40. There may be, for example, ten screen control blocks and ten sets of window control blocks, one each for each screen layout. A given screen control block 32 points to a corresponding set of window control blocks 34. Each presentation space 38 has at least one window per screen layout. The presentation spaces, but not the windows, are common to all screens. The window control block 34 corresponding to a given presentation space 38 in that screen layout defines the origin (upper left hand corner) of the window in the presentation space, the origin of the window on the display screen, and the width and height of that window in the presentation space. The screen matrix 40 is a map of the data to be displayed and, in one embodiment, maps on a one for one basis the characters that can be displayed on the CRT screen, but the mapping could be on a pel basis or any other basis. All application output from the several tasks is directed to memory and specifically to the presentation spaces 38 rather than the hardware refresh buffer. In FIG. 7, a micro computer such as the IBM Personal Computer (PC) is assumed to be attached to a host computer such as an IBM 3270 computer via a controller such as an IBM 3274 controller. For this case, the PC hardware buffer $12_2$ acts as the PC presentation space. Each presentation space is assigned an identification tag and has an associated window defined by the operator or an application program as to size and screen location. When the operator or an application program adjusts the windows relative to one another, the system builds an image in the screen matrix 40 consisting of the identifying tag aligned in the appropriate locations. The matrix 40 may be created in a reverse order from that appearing on the CRT screen allowing overlapping windows to be built up by overwriting. Alternatively, by using a compare function, the matrix 40 can be created by beginning with the top window. The choice of the method of creating the matrix 40 is based on desired system performance. The system directs output to the refresh buffer by filtering all screen updates through the screen matrix 40, allowing a performance increment in an overlapped window system by only allowing those characters that actually need to be reflected on the screen to be so, and those that do not, will not cause an unnecessary redraw. The absence of these unnecessary redraws removes the requirement for continual updates of all windows whenever the contents of one is altered.

In order to write a character, the IBM 3274 controller, a supervisor application or the PC writes character code into presentation space 38 at locations designated by that presentation space's cursor value control block. No other updates are required. The new character will be displayed or not according to whether it falls within the window designated by the corresponding window control block 34 and the portion of that window designated for display by the screen matrix 40. To use the PC buffer $12_2$, a window control block is established for the PC the same as any other window control block 34 including width, height, presentation space origin, and screen origin. The screen matrix 40 is updated with the code FF to define the PC displayable window, and data from the window in the PC buffer defined by the window control block 34 will, to the extent allowed by the screen matrix 40, appear on the CRT screen. This control is performed by the decoder 28' which detects the code FF and selectively enables the AND gates in selection logic 30' to pass either the data in the PC screen buffer $12_2$ or the data in the non PC screen buffer $12_1$. This control is similar in function and operation to the decoder 28 in FIG. 6. Data within a window may be scrolled by decrementing or incrementing the X or Y value of the window origin. No other control updates are needed. Only the corresponding window in the screen buffer is rewritten or, if a PC window, the offset register is changed. A window can be relocated on the screen by changing the origin coordinates in the window control block 34 for that window. The screen matrix 40 is updated, and the entire non-PC screen buffer is rewritten with data for non-PC tasks and codes (hexadecimal FF) for the PC. To enlarge the visible portion of a presentation space without scrolling, the window control block 34 for that presentation space 38 is first updated by altering the width or height. This adds to the right or bottom of the window only unless there is also a change in the origin of the window. Ordinarily, there is no change in the origin unless there is an overflow off the presentation space or screen, in which case, the corresponding origin is altered. Next, the screen matrix 40 is updated by over-writing window designator codes of the matrix, starting with the lowest priority window control block. Then, all windows to non-PC refresh buffer $12_1$ are rewritten with data from the presentation space for the non-PC windows and the hexadecimal code FF for the PC window.

Figure 8:
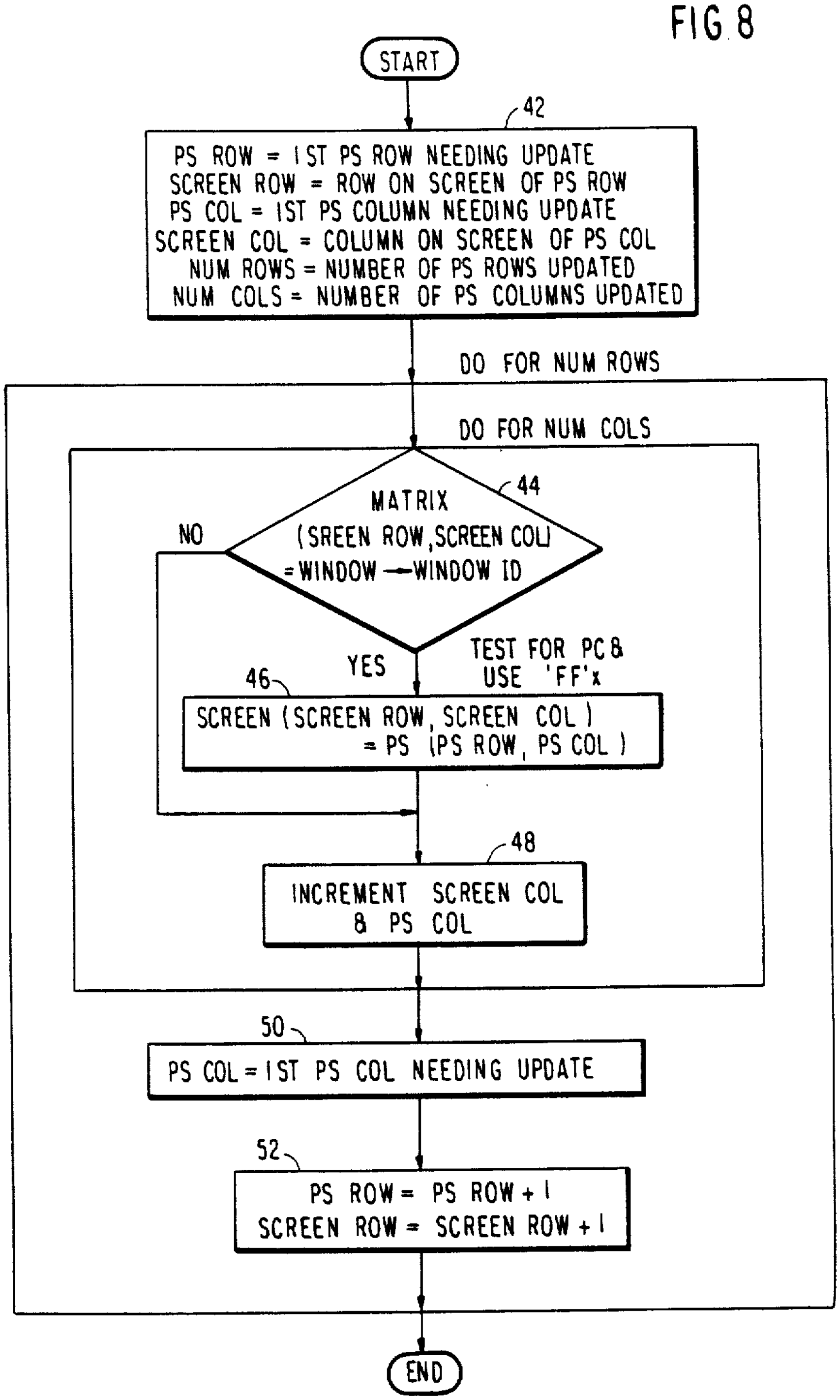
FIG. 8 is a flow chart illustrating the process of updating the windows of the presentation spaces shown in FIG. 7.

FIG. 8 shows a flow chart of the process for window updating. In block 42, the presentation space (PS) row is set to the first PS row needing update; the screen row is set to the row on the display screen of the PS row; the PS column is set to the first PS column needing update; the screen column is set to the column on the screen of the PS column; the number of rows is set to the number of PS rows to be updated; and the number of columns is set to the number of PS columns to be updated. Then, the procedure which follows is done for the number of rows to be updated. For the number of columns to be updated, the matrix 40 is checked to determine if the screen row and column is within the window to be updated. This is indicated by the decision block 44. A test is made for the PC since hardware buffer $12_2$ is the presentation space for the PC, and the hexadecimal code FF is used to denote the PC window. If the decision of block 44 is yes, then the screen row and column are set to the PS row and column as indicated by block 46, and the screen column and the PS column are incremented as indicated by block 48; otherwise, the screen column and PS column are incremented without setting the screen row and column to the PS row and column. When this process is complete for the number of columns to be updated, the PS column is updated to the first PS column needing update as indicated by block 50. Then, the PS row is incremented, and the screen row is incremented as indicated by block 52.

Figure 9:
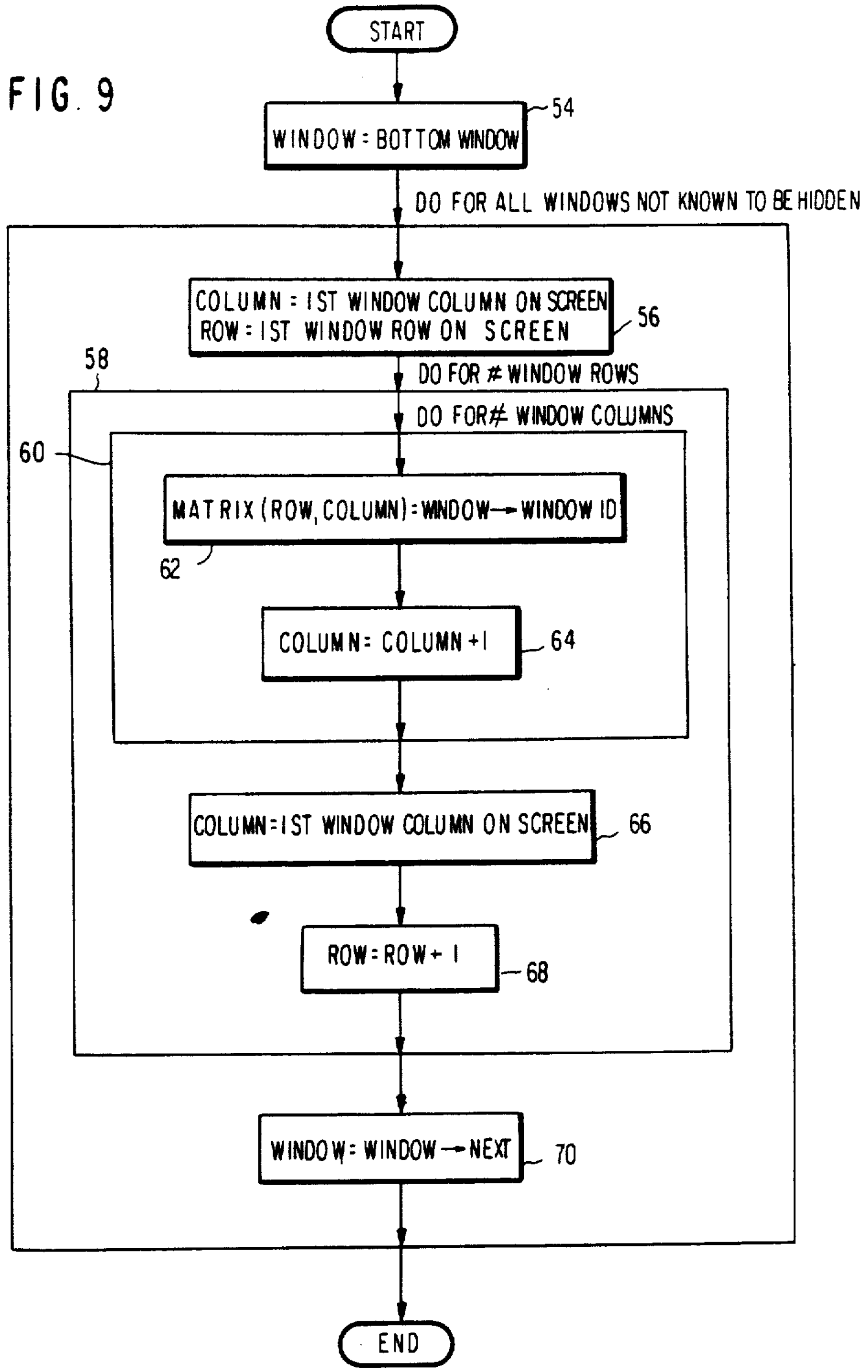
FIG. 9 is a flow chart illustrating the process of building the screen matrix shown in FIG. 7.

FIG. 9 shows the flow chart for building the screen matrix 40. First, the window is set to the bottom window as indicated in block 54. Then for all windows not known to be hidden, the following procedure is performed. In block 56, the column is set to the first window column on the screen, and the row is set to the first window row on the screen. For the number of window rows, the procedure indicated within block 58 is followed, and this procedure includes the procedure indicated within block 60 for the number of window columns. In block 60, the matrix row and column is set to the window identification as indicated in block 62. Next, the column is incremented as indicated by block 64. Exiting block 60 but still within block 58, the column is set to the first window column on the screen as indicated by block 66. Then, the row is incremented as indicated by block 68. Now exiting block 58, the window is incremented to the next window as indicated by block 70.

Those skilled in the art will realize that the invention has been described by way of example making reference to but one preferred embodiment while describing or suggesting alternatives and modifications. Other alternatives and modifications will be apparent to those skilled in the art. Various hardware and software tradeoffs may be made in the practice of the invention without departing from the scope of the invention as defined in the appended claims. For example, in the system shown in FIG. 7, the hardware buffer $12_2$ could be eliminated by providing a presentation space in system memory for the PC. Also, while character box display buffers have been assumed in the example described, the principles of the invention are equally applicable to all points addressable (APA) buffers for support of graphical displays.

We claim:

1. A multiple data window display system of the type for displaying data from independent application programs in a multi-tasking environment on a common display screen, said display system comprising:

screen buffer means including plural separate memory means for storing scan image defining data, the scan image defining data stored in each of said plural separate memory means comprising application data from a different one of said independent application programs which is to be displayed on said common display screen, each of said plural separate memory means storing sufficient data to fill an entire display screen;

video means for generating video display signals to said display screen in response to scan image defining data; and control means for selectively coupling an output of a given single one of said plural separate memory means of said screen buffer means to said video means at any given time so that at any point on said display screen the data displayed originates from a selected one of said plural separate memory means of said screen buffer means to produce a composite screen picture of data windows derived from said plural separate memory means thereby displaying data from said independent application programs simultaneously on said common display screen, said control means comprising task selection memory means for storing a map of areas of said display screen corresponding to areas for the display of the image defining data from each of said plural separate memory means of said screen buffer means, window coordinate generating means for simultaneously generating coordinates defining said data windows, and window address generating means responsive to said window coordinate generating means for simultaneously modifying data window display addresses according to coordinates defining said data windows for each of said independent application programs.

2. The multiple window display system as recited in claim 1 wherein said screen buffer means comprise plural screen buffers and said window address generating means for simultaneously supplying addresses to each of said plural screen buffers, said window address generating means including plural offset means, one for each of said plural screen buffers, for receiving referesh addresses supplied in common to each of said plural offset means and modifying said refresh address before they are supplied to said plural screen buffers.

3. The multiple window display system as recited in claim 2 wherein said task selection memory means receives addresses in synchronism with addresses supplied to said plural screen buffers and further includes decoding means for decoding codes generated by said task selection memory means in response to said addresses, said decoding means producing an enable signal for a selected one of said plural screen buffers at any given time.

4. The multiple window display system as recited in claim 2 wherein said task selection memory means includes one of said plural screen buffers which is designated as a non-transparent screen buffer, said non-transparent screen buffer having stored therein unique code points which are used to select among the remaining screen buffers, the data in said plural screen buffers being read out in synchronism with refresh addresses supplied thereto and said task selection memory means further comprising:

decoding means connected to the output of said non-transparent screen buffer for decoding said unique code points, said decoding means producing an enable signal for a selected one of said plural screen buffers at any given time in response to the decoding of one of said unique code points; and gating means connected to the output of said non-transparent screen buffer and responsive to said decoding means for passing character codes from said non-transparent screen buffer to said character generator when no unique code points are decoded by said decoding means.

* * * * *